Patented May 15, 1923.

1,455,016

UNITED STATES PATENT OFFICE.

FREDERICK C. ATKINSON, OF INDIANAPOLIS, INDIANA.

PROCESS OF PRESERVING COTTON SEED.

No Drawing.   Application filed May 3, 1919.  Serial No. 294,609.

*To all whom it may concern:*

Be it known that I, FREDERICK C. ATKINSON, a citizen of the United States, residing at Indianapolis, in the county of Marion and State of Indiana, have invented certain new and useful Improvements in Processes of Preserving Cotton Seed, of which the following is a specification.

It is well known that cotton seed harvested and ginned early in the season contain so much moisture that they cannot be stored safely for any considerable time unless artificially dried, due to the fermentation which ensues in the presence of moisture and a warm atmosphere. The object of my said invention is to provide a method of preparing said seed so that they may be preserved against such deterioration and fermentation.

By experiments I have discovered that this moisture readily passes from the interior of the seeds to the fiber attached to the hulls where it remains absorbed by such fiber and in this location is to a large degree the cause of the fermentation, and I have devised a plan for removing this moisture from the lint or cotton fiber and thus insure the keeping quality of the seeds.

My method of removing this moisture is based on the hygroscopic nature of starch and starchy products and consists in mixing the seeds to be treated with well dried starchy matter,—allowing the starchy matter to absorb the moisture and then removing the starch by means of sieves. Or when the seeds are to be made into feed they may be crushed without removing the starch, if desired, as the starch adds to the food content of the seed cakes.

My process consists in mixing a small amount of very dry starch, or cereal flour, or cereal meal, with the seeds and allowing the mixture to stand a few hours, or any length of time, sometimes many days. If the seeds are very high in moisture it is better to use 5 to 10% of dry starch flour and allow the mixture of seeds and starch to lie in storage 10 to 20 hours and then pass same over a sieve to remove the starch which has become practically saturated with moisture. The seeds are then mixed with an additional quantity of thoroughly dried starch, or cereal flour, which will usually serve to preserve them. The starch should be dried to a moisture content of less than 1% although this low percentage is not imperative. Starch thus dried will rapidly absorb water until it reaches 15% or even more moisture and still have the texture of a dry flour.

This absorption of water takes place with great avidity and is very effective but is not to be used with seeds that are sloppy wet or contain droplets of water, such as those exposed to the elements in rainy weather. It is however very effective for finely divided moisture, as mist, or that absorbed in the capacity of cotton lint or other fibrous material.

I prefer to make this mixture as the cotton seeds are moved along a helical conveyor, or by feeding into the same the required quantity of dry starch by means of a feeding machine of any appropriate construction.

The mixed seeds and starch are conveyed directly to the storage bins. When a second addition of starch is required to dry the seed sufficiently, they are subsequently taken from the first storage bin, run over a screen to remove the saturated starch and a second quantity of dry starch is added, as before stated.

The starch used for this purpose may be separated from the seeds, redried and used several time.

Having thus fully described my said invention, what I claim as new and desire to secure by Letters Patent, is:

1. The process of treating cotton seed for the purpose of preserving the same against deterioration due to fermentation which consists in intimately mixing with said cotton seed and among the fibres adhering thereto a dry, pulverized, starchy product, substantially as set forth.

2. The process of treating cotton seed for the purpose of preserving the same against deterioration due to fermentation which consists in mixing a small amount of very dry, pulverized, starchy product with the seeds, allowing the same to stand for a period of time, then passing the same over a sieve to remove the starch, substantially as set forth.

3. The process of treating cotton seed for the purpose of preserving the same against deterioration due to fermentation which consists in mixing from five to ten per cent of dry, pulverized, cereal product with the seeds and allowing the seed to remain in contact with said pulverized product for a considerable period of time.

In witness whereof, I have hereunto set my hand and seal at Indianapolis, Indiana, this 23rd day of April, A. D. nineteen hundred and nineteen.

FREDERICK C. ATKINSON. [L. S.]

Witness:
M. L. THULER.